Feb. 19, 1963
R. MÜLLER
3,078,384
METHOD OF AND DEVICE FOR AMPLIFYING HIGHEST FREQUENCIES
Filed Sept. 8, 1958
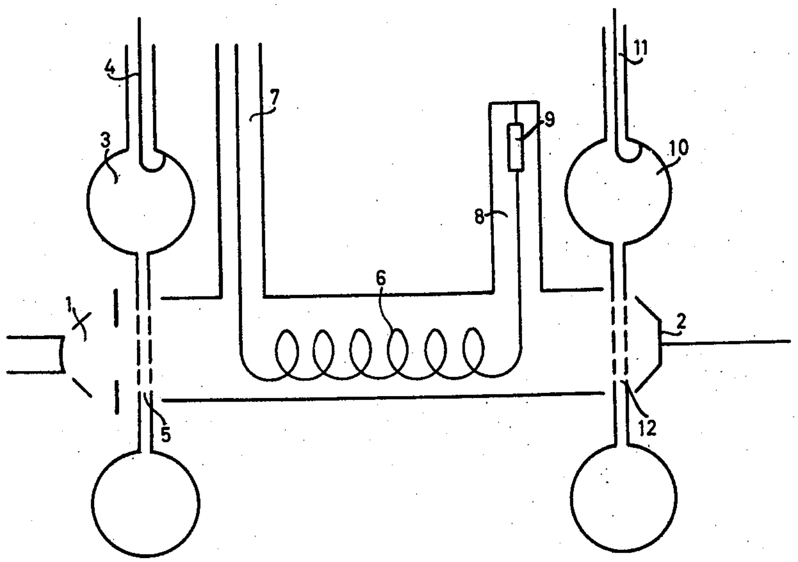
Inventor:
Rudolf Müller
By [signature] Atty.

United States Patent Office 3,078,384
Patented Feb. 19, 1963

3,078,384

METHOD OF AND DEVICE FOR AMPLIFYING HIGHEST FREQUENCIES

Rudolf Müller, Strasslach, near Munich, Germany, assignor to Siemens and Halske Aktiengesellschaft Berlin and Munich, a corporation of Germany
Filed Sept. 8, 1958, Ser. No. 759,681
Claims priority, application Germany Nov. 6, 1957
7 Claims. (Cl. 315—3.5)

This invention is concerned with a method of and device for amplifying highest frequencies by means of an electron tube operating in accordance with the traveling wave principle, wherein the frequencies coupled at the input are taken off amplified at the output.

It is known in connection with traveling wave tubes for highest frequencies, presuming the presence of periodic structures constituting lines for electromagnetic waves, that the so-called spatial partial waves can be defined. All the spatial partial waves have the same frequency, but have different phase velocities. The same applies for electron beams with spatially different structure, for example, for beams with velocity leaps. If a periodic structure such as velocity leaps in an electron beam passes a fixed observation point with a certain given speed, the Doppler effect will cause the spatial partial waves moving in the electron beam to appear to the fixed observer with different phase velocity as partial waves of different frequency and different phase velocity. Therefore, a spreading is at different frequencies possible for the above mentioned electron beams with periodic structure. All of these partial waves with different frequency are, however, simultaneously present and only all of them taken together describing the electrokinetic course occurring in the electron beam. These partial waves with different frequencies have the same properties as the spatial partial waves: it is particularly to be observed that the amplitude of a partial wave can be changed only if the amplitudes of all other partial waves are changed in the same ratio.

Traveling field tubes are known as mixing stages for highest frequencies, wherein two frequencies $fa$ and $fb$ are placed upon one or more delay lines and wherein these frequencies are due to the non-linearity of the structure mixed so as to produce the intermediate frequency $fm=fa\pm fb$.

It is further known to construct traveling field tubes for amplification purposes so that the delay line which is first passed by the electron beam serves for producing an electromagnetic wave while the delay line thereafter passed by the electron beam serves for the amplification of a higher harmonics of the previously produced electromagnetic wave. Accordingly, in this known tube, the first delay system is constructed for a lower frequency than the second delay system.

All previously known traveling field systems for the amplification or for the mixing of highest frequencies have the common feature that the corresponding electromagnetic wave can be described only through a plurality of spatially harmonic partial waves with different phase velocities but identical frequency.

The production and amplification of highest frequencies, especially within the millimeter wave range, causes great difficulties because the elements required for the effect of the reciprocal mechanism between the electromagnetic wave and the electron beam become too small and, accordingly, very high requirements are placed upon conducting off the heat developed in the system and keeping of the necessary tolerances.

The object of the invention is, in view of this situation, to produce a new traveling field tube for still higher frequencies, which does not make use of a further diminution of the above mentioned system parts.

The method according to the invention, for amplifying highest frequencies, comprises coupling the input signal to be amplified to the electron beam of a tube which in the known mode of operation does not amplify the input signals, and affecting the electron beam in addition to the effect of the input signal by a periodic disturbance occurring between the coupling and uncoupling space of the signal to be amplified, which disturbance is of such intensity that its value is substantially maintained in the electron beam over the amplification path, and that one or more partial waves of different frequencies, produced by affecting the electron beam with the periodic disturbance, lies within the amplification range of the tube.

In the previously known amplifier tubes constructed in accordance with the traveling field principle, the input signal is directly amplified, that is, the input coupling device and the device for amplyfying (device for the reciprocal mechanism between electromagnetic wave and electron beam) and the output coupling device, are designed for the frequency of the input signal. In the method according to the invention, the input signal is amplified indirectly. The input coupling and the output coupling are for this purpose tuned to the frequency of the input signal. The amplifying device is, however, designed for a frequency differing from that of the input signal. A periodic disturbance, in particular an electromagnetic wave recurring over the amplification path, is in addition fed to the amplifying device, the frequency of such electromagnetic wave being equal to or dissimilar to the frequency of the amplifying device and dissimilar to the input frequency. Upon operation of a tube according to the invention, there will appear partial waves $fn$ with different frequencies. One of these partial waves $fn''$ must lie within the amplification range $fo\pm\Delta f$ of the tube and must be amplified, so that the amplitudes of the partial wave $fn'$, constituting the input signal, are amplified over the fixed "bond" or inter-relationship of all frequency components of the partial waves. The selection of the frequencies can be explained best by an equation.

The tube is constructed for the amplification of an electromagnetic wave with a frequency $fo$ or rather to say a frequency band $fo\pm\Delta f$. The electron beam is in addition to the input signal affected by an electromagnetic wave with the frequency $f1$. There will accordingly appear partial waves with different frequencies $$fn=fo+n.f1$$

The factor $n$ may represent desired whole numbers from 0 to $\pm\infty$. Of practical importance are, however, only those factors $n$ in connection with which the coupling of the selected partial waves to the electron beam suffices for the method of the invention. For obtaining the reciprocal action of the strongly effective electromagnetic wave of the frequency $f1$ with the electron beam, there may be provided a wave guide in a known structural form, such as an electron beam, a delay line or the like. It is advantageous for the amplification of highest frequencies to make the frequency $f1$ of the strongly effective electromagnetic wave lower than the frequency $fn'$ of the input signal. Moreover, it is for the same purpose of advantage, to make the amplification frequency $fo$ or rather the amplification band $fo\pm\Delta f$ of the tube lower than the frequency $fn'$ which is to be amplified. The strongly effective frequency $f1$ may be produced by a rearward wave oscillator formed in the same tube. It is further possible to conduct the input signal $fn'$ with the strongly effective electromagnetic wave with the frequency $f1$ simultaneously to one and the same wave guide. The designation $fn'$ of the frequency of the input signal is intended to indicate that this frequency is within the frequency spectrum $fn$.

The foregoing and further objects and features will appear from the description of an embodiment which is rendered below with reference to the single FIGURE of the accompanying drawing. It is understood, however, that the illustrated embodiment is only one of many possible embodiments and that it is shown in simplified and in part schematic representation. Parts which are not absolutely necessary for an understanding of the invention have been omitted.

The electron gun 1, comprising a cathode, a Wehnelt cylinder and a pull anode, produces an electron beam which passes through the electrical double layer 5 of a cavity resonator 3. The input signal with a desired frequency $fn'$ is supplied to the cavity resonator 3 by way of the input line 4. The electron beam is upon passing through the capacitance surfaces 5 modulated in rhythm with the electric field produced thereupon. The electron beam which is thus premodulated passes through the delay line 6, formed as a helix, a strongly effective frequency $f1$ being conducted to the helix at the input 7. The helix 6 terminates reflection-free in a matching member 8 comprising the resistor 9. There will appear upon the helix 6 an electromagnetic wave flowing with the electron beam, the high energy content of such wave affecting the electron beam so that space-harmonic partial waves are produced in the electron beam and flowing therewith. The input 7 and the matching member 8 may be exchanged so that the periodic disturbance affects the electron beam flowing counter thereto. An observer standing at a fixed point outside the tube accordingly will "see" (using a figure of speech), the space harmonic partial waves produced in the electron beam upon the helix 6 by the strongly effective frequency $f1$, as partial waves with different frequencies. Using the same metaphor, this fixed observer will "see" the electron beam modulation obtained by the action of the cavity resonator 3 as an influencing of the electron beam in timing with the input frequency. Since the tube is designed for a predetermined frequency $fo$ or rather to say for a more or less extensive frequency band $fo\pm\Delta f$, a partial wave within this amplification range can be amplified with the frequency lying within such range. This partial wave was produced by the action of the strongly effective electromagnetic wave of the frequency $f1$ upon the space discharge wave of the input frequency $fn$. It is thus, for example, possible in a traveling wave tube according to the figure, to conduct to the helix 6 a wave with the frequency $f1=4000$ megacycles. Assuming the tube to be constructed for an amplification band $fo\pm\Delta f=3600$ megacycles to 4200 megacycles, input frequencies of 7600 megacycles can be amplified to 8200 megacycles.

The uncoupling system following the helix 6 consists substantially of a cavity resonator 10 comprising the electrical double layer 12. The amplified input signal is uncoupled at the output line 11. The electrode 2 serves as a target for the electron beam.

The input coupling system 3 and the device 6 for producing the partial waves of different frequencies, may be combined a single system. The wave conductor 6 must in such a case be designed so that it has the required band width.

The invention is not limited to the illustrated embodiment but may receive different form considerably deviating therefrom. It is, for example, possible to substitute delay lines for the input coupling system 3 and for the output coupling system 10, respectively.

It is furthermore possible to omit the delay line 6 and to use in its place an electron beam with periodic structure. Care must in such case be taken that the periodic structure of the electron beam moves approximately with electron velocity. In such a system, operating with two electron beams, it is also possible to move such beams in opposite directions. The only thing that is in such case important is, that partial waves are produced having different frequencies.

Changes and modifications are, therefore, possible within the scope and spirit of the appended claims which define what is believed to be new and desired to have protected by Letters Patent.

I claim:

1. A traveling wave tube for amplifying highest frequencies comprising means for producing an electron beam, an input part disposed in the path of said beam in which the input signal frequency is coupled to the electron beam, an output part in which the signal frequency is decoupled, said output part being disposed in the electron beam path and tuned to the signal frequency, an amplifier part disposed between said input and output parts including means for introducing therein a strong electromagnetic wave with a frequency which is lower than the signal frequency operative to effect a reciprocal action between the electromagnetic wave and the electron beam over the entire length of the amplifier part, the latter being constructed for frequencies which are lower than the signal frequency and lower than the frequency of the strong electromagnetic wave.

2. An electron tube according to claim 1, wherein said electromagnetic wave flows counter to the direction of flow of said electron beam.

3. An electron tube according to claim 1, comprising a wave guide, said electromagnetic wave being in reciprocal action with said electron beam over said wave guide.

4. An electron tube according to claim 3, wherein an electron beam constitutes said wave guide.

5. An electron tube acording to claim 3, comprising a delay lien constituting said wave guide.

6. An electron tube according to claim 1, comprising a system for producing said electron beam, a target electrode, an input coupling device for said input signal which affects said electron beam periodically, a device for uncoupling the high frequency energy of the density-modulated electron beam, and a delay line disposed between said coupling-uncoupling devices and uncoupled therefrom.

7. An electron tube according to claim 6, wherein said delay line is dimensioned so as to permit coupling thereto the input signal and the electromagnetic wave.

References Cited in the file of this patent

UNITED STATES PATENTS

| | | |
|---|---|---|
| 2,584,308 | Tiley | Feb. 5, 1952 |
| 2,657,305 | Knol et al. | Oct. 27, 1953 |
| 2,737,585 | Wolff | Mar. 6, 1956 |
| 2,794,936 | Huber | June 4, 1957 |
| 2,805,333 | Waters | Sept. 3, 1957 |
| 2,814,756 | Kenmoku | Nov. 26, 1957 |
| 2,828,439 | Fletcher | Mar. 25, 1958 |
| 2,894,168 | Wing et al. | July 7, 1959 |

OTHER REFERENCES

Manley et al: "Some General Properties of Nonlinear Elements," Proc. IRE, vol. 44, pages 904–913; July 1956.

Suhl: "A Proposal for a Ferromagnetic Amplifier in the Microwave Range," Physical Review, vol. 106, pages 384–385; April 1957.

Article by R. W. De Grasse and G. Wade, pp. 1012–1015, Proc. IRE for July 1957.

Article by W. H. Louisell and C. F. Quate, pp. 707–716, Proc. IRE for April 1958.